J. J. MIKSHEL.
FLUE CLEANING MACHINE.
APPLICATION FILED NOV. 22, 1919.

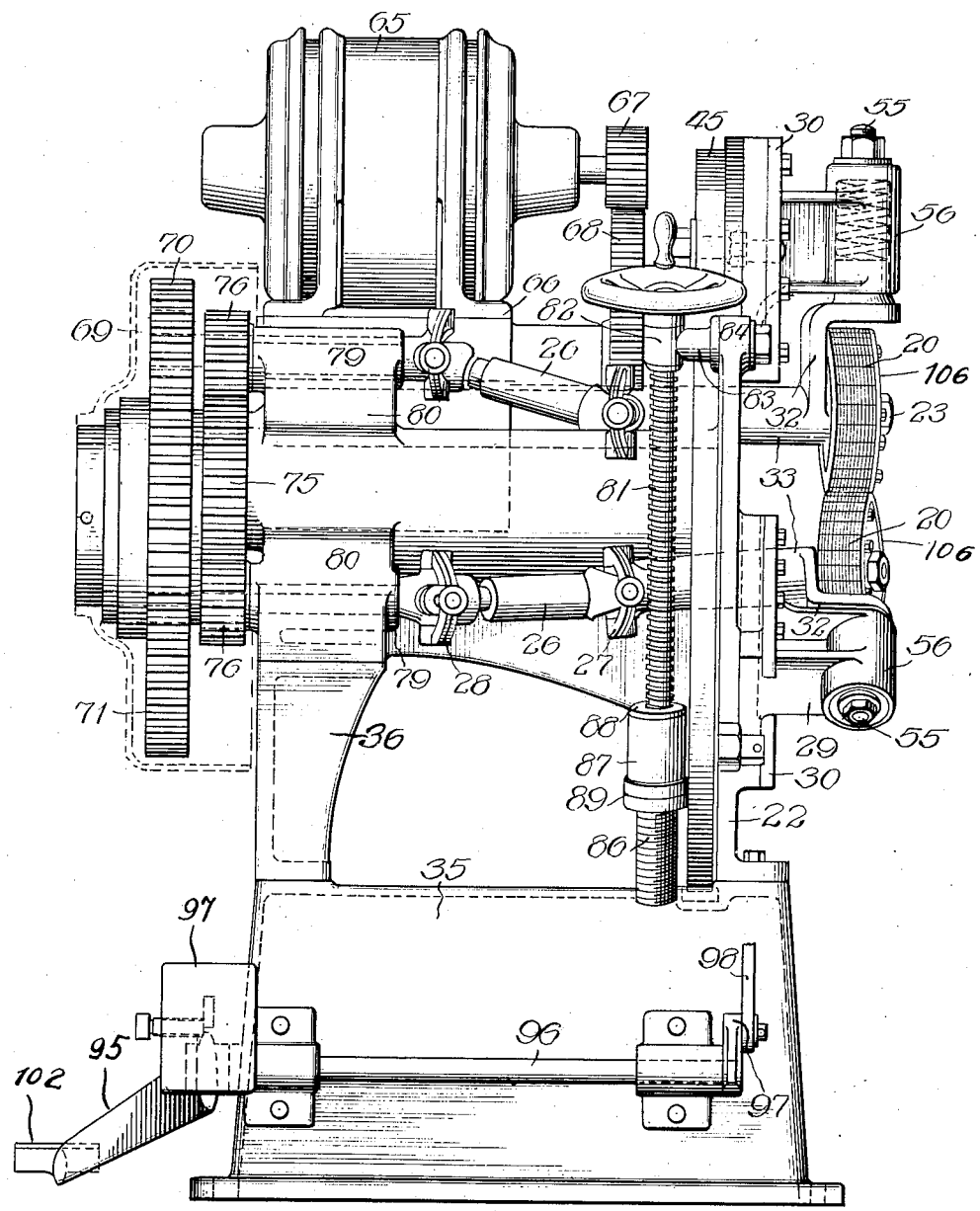

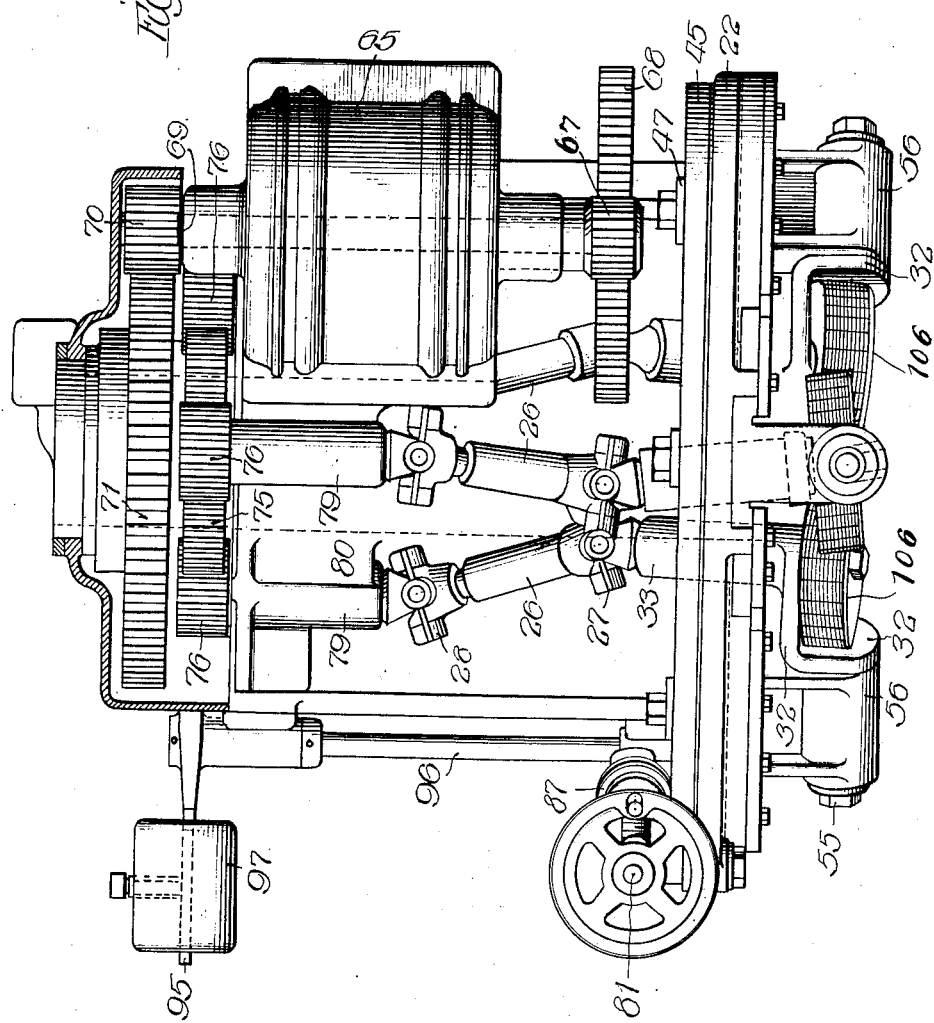

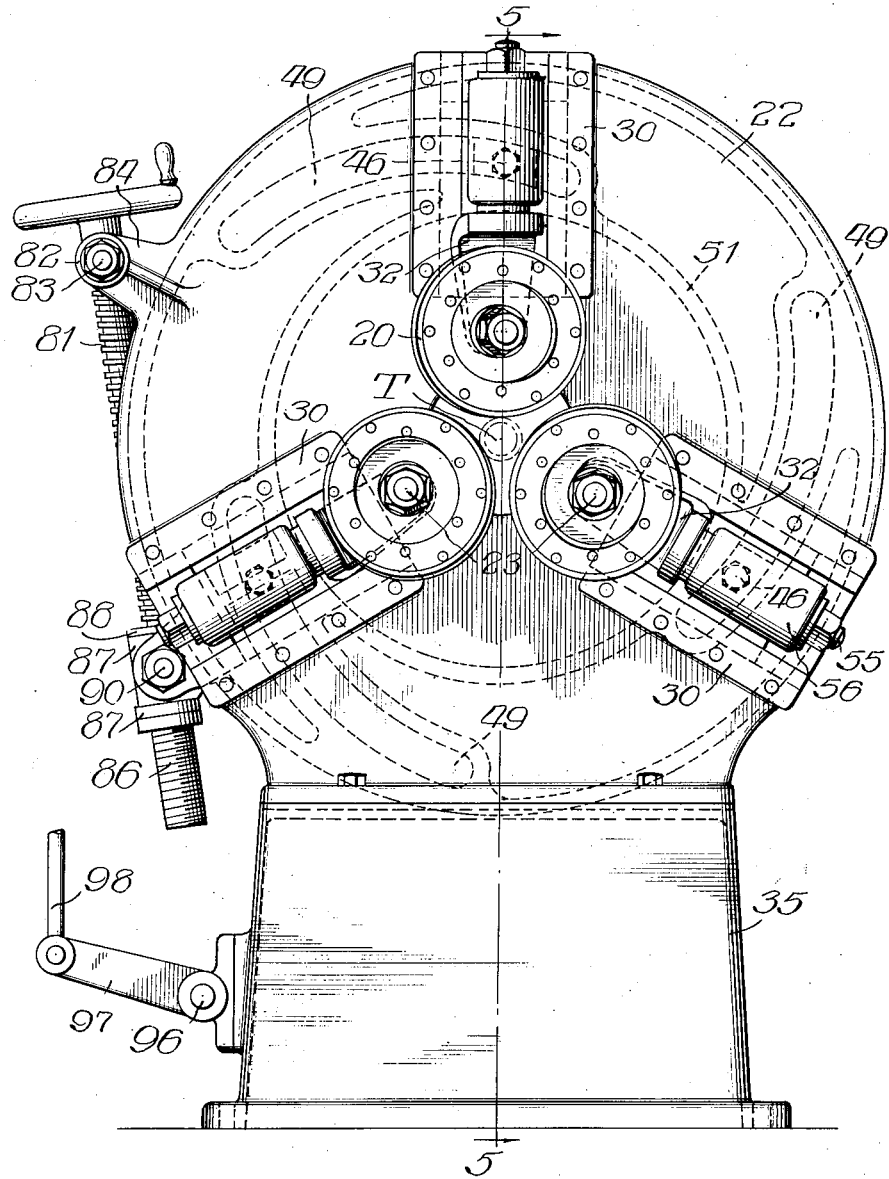

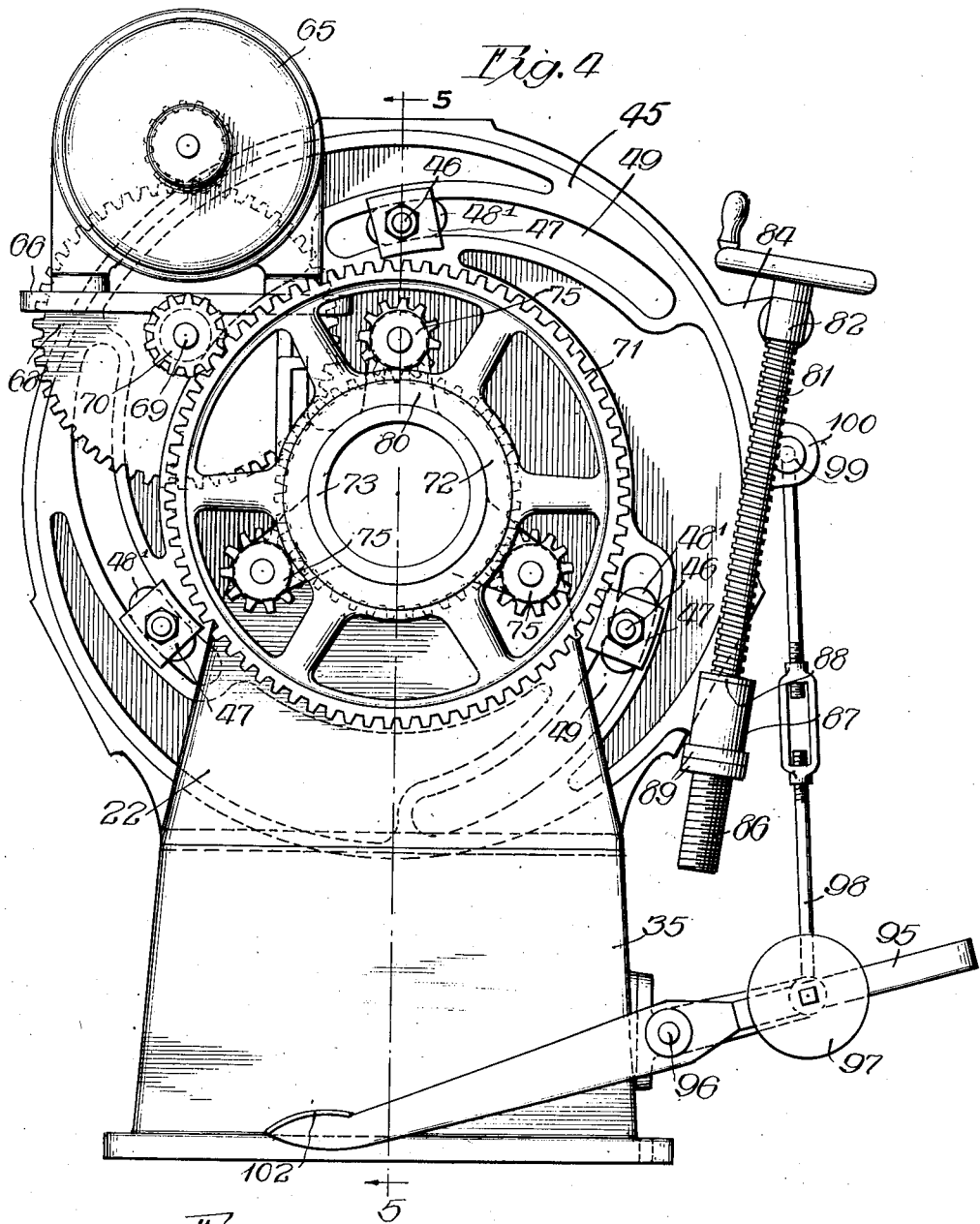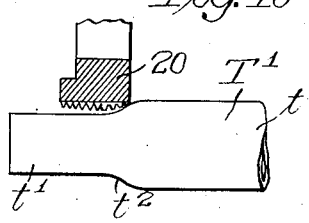

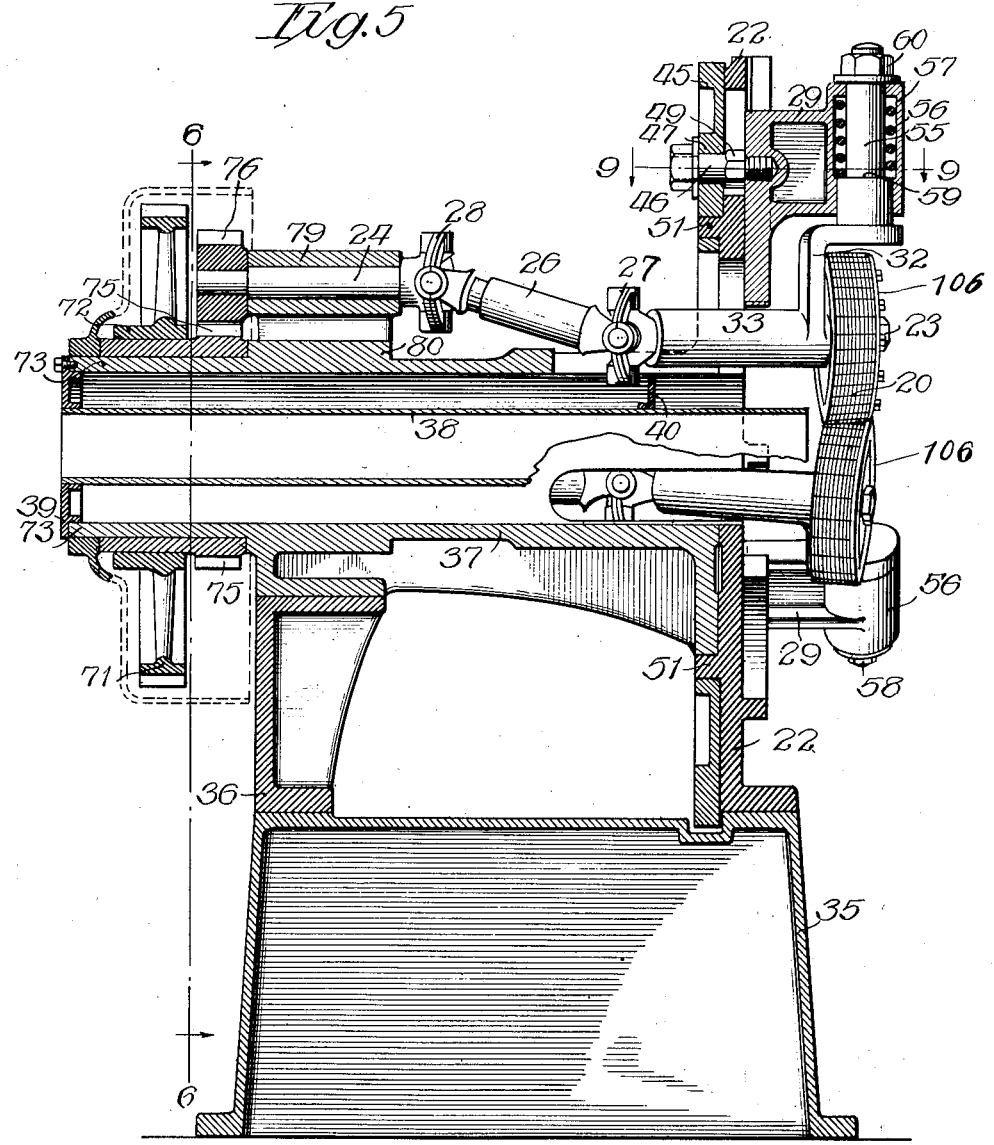

1,406,047.

Patented Feb. 7, 1922.
8 SHEETS—SHEET 6.

Inventor
John J. Mikshel
By

J. J. MIKSHEL.
FLUE CLEANING MACHINE.
APPLICATION FILED NOV. 22, 1919.
1,406,047.
Patented Feb. 7, 1922.
8 SHEETS—SHEET 7.
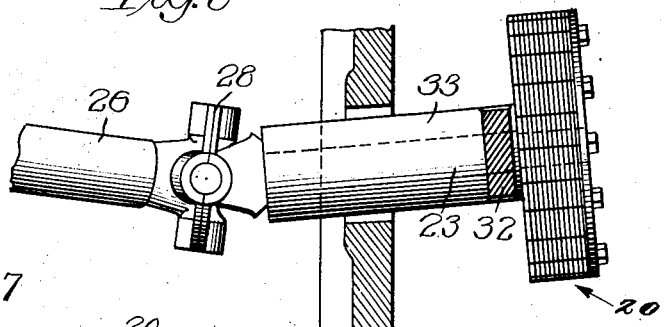
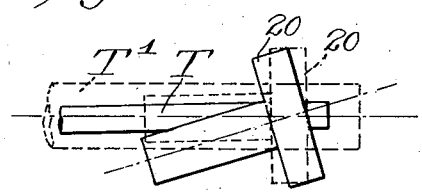
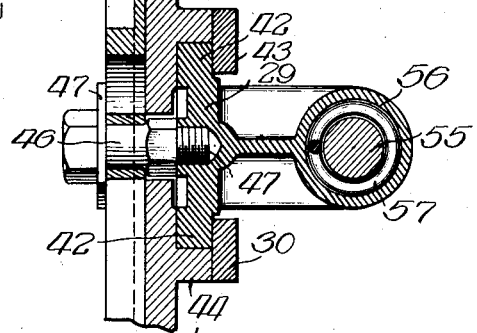
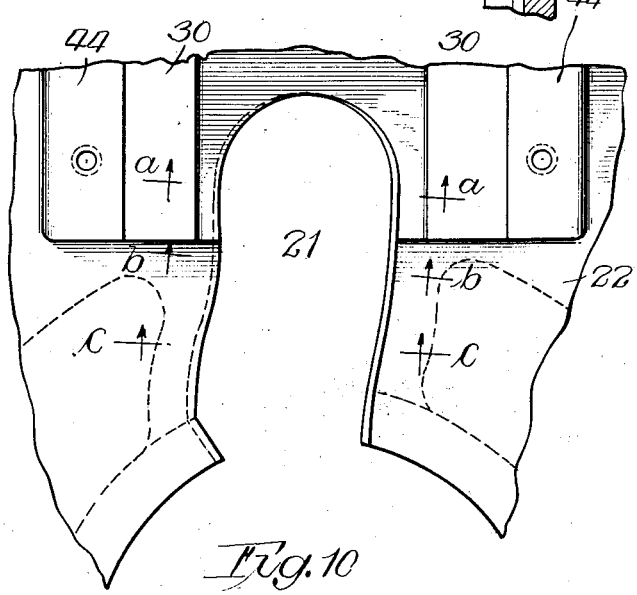
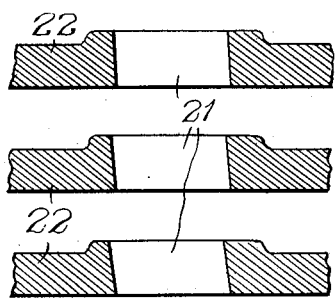
Inventor.
John J. Mikshel.
By William H. Hall Atty.

J. J. MIKSHEL.
FLUE CLEANING MACHINE.
APPLICATION FILED NOV. 22, 1919.

1,406,047.

Patented Feb. 7, 1922.
8 SHEETS—SHEET 8.

Inventor
John J. Mikshel.
By: William L. Hall Atty.

UNITED STATES PATENT OFFICE.

JOHN J. MIKSHEL, OF CHICAGO, ILLINOIS, ASSIGNOR TO JOSEPH T. RYERSON & SON, A CORPORATION OF ILLINOIS.

FLUE-CLEANING MACHINE.

1,406,047.  Specification of Letters Patent.  Patented Feb. 7, 1922.

Application filed November 22, 1919. Serial No. 340,066.

*To all whom it may concern:*

Be it known that I, JOHN J. MIKSHEL, a citizen of the United States, and a resident of Chicago, in the county of Cook and State of Illinois, have invented certain new and useful Improvements in Flue-Cleaning Machines; and I do hereby declare that the following is a full, clear, and exact description thereof, reference being had to the accompanying drawings, and to the characters of reference marked thereon, which form a part of this specification.

This invention relates to improvements in flue cleaning machines of that type in which the flues are presented individually to the machine and passed across the cleaning elements for the purpose of removing external scale from the flues.

The main or principal object of the invention is to provide an improved mechanism in machines of this general character wherein and whereby flues of different diameters may be equally well cleaned of the scale thereon. In machines of this class the cleaning elements usually comprise a series of rolls (as three rolls) between which the flues are passed for operation thereon by the rolls.

In respect of this phase of the invention an object thereof is to provide an improved means for arranging the cleaner rolls relative to each other and to their adjusting and driving mechanism so that the rolls may be radially adjusted with respect to the axis of the flue being cleaned in such manner that the cleaning faces of the rolls may be made to bear with substantially equal cleaning or contact areas across the roll width upon flues of different diameters and within the range of the machine, whereby all the flues within the diameter range to be treated by the machine may be equally well cleaned of adhering scale.

A further object of the invention is to provide in a flue cleaner of the character described, novel means to radially adjust the cleaner elements.

Another feature of the invention resides in the relation of the axes of rotation of the cleaner rolls so that a tube entered in the space surrounded by the rolls is automatically fed, as by a screw thread action, due to the angles of the rolls and to the contour of their peripheries, which relation is maintained in all adjustments for different diameter tubes.

Another object of the invention, with respect to the two phases just referred to is to provide a novel means of arranging, driving, and adjusting the cleaner rolls so that the linear feed of the flue for each rotation of the flue is substantially equal or uniform in all sizes of flues which the machine is designed to clean so that, notwithstanding the slower rotation imparted to the larger diameter flues, due to the driving contact of the constant speed cleaner rolls therewith, the linear feed of the larger flues for each rotation thereof is substantially the same as the linear feed of the smaller tubes for each rotation thereof, whose rotative speed is faster than that of the larger tubes.

Another object of the invention is to provide an improved driving mechanism for the cleaner rolls connected to a common source of power and adapted to permit radial adjustment of rolls towards and from each other to admit larger or smaller tubes.

Another object of the invention is to provide a novel guide means for the shafts of the cleaner rolls which permits substantial radial adjustment of said rolls toward and from each other, while at the same time maintaining the desired uniform face contact of the rolls with flues of varying diameters.

A further object of the invention is to provide a cleaner roll having a cleaning or cutting periphery which is so constructed as to maintain wide contact surface with the flues to clean the flues in all positions of the adjustment of the rolls, and also so formed or constructed as to produce, by reason of the relative angles of their axes of rotation a leading thread-like action which feeds the flues between the rolls.

Another object of the invention is to provide cleaner rolls whose contacting, toothed faces are offset relatively to each other so that all parts of the flue, longitudinally considered, are uniformly cleaned.

Another object of the invention is to provide a novel form of cleaner roll and mechanism for controlling the same so constructed as to closely conform to a flue varying in diameter in its length, as for instance a superheater flue which is of considerable less diameter at the flue sheet end than in other parts thereof.

A further object of the invention is to provide novel means of mounting the slides which carry the cleaner rolls and other means which co-operate with said slides for radially adjusting the positions of the rolls.

Other objects of the invention are to improve and simplify machines of this general character and to provide a single machine which may be adjustably adapted to clean flues having a considerable variation of diameter so as to thereby produce what may be termed a universal flue cleaner.

In the drawings,—

Figure 1 is a front elevation of a flue cleaner embodying my invention.

Figure 2 is a plan view thereof, with parts in section.

Figure 3 is one side elevation of the machine.

Figure 4 is the reverse side elevation thereof.

Figure 5 is a vertical section of the machine taken generally, on the line 5—5 of Figure 4.

Figure 8 is a sectional detail illustrating one of the rolls, its guide, and its driving mechanism.

Figure 9 is a detail section on the line 9—9 of Figure 5.

Figure 10 is an enlarged fragmentary view of the roller mounting guide and supporting plate shown in Figure 7.

Figure 11 shows separate sections, successively indicated on the lines $a, a, b\ b, c\ c$ of Figure 10.

Figure 12:
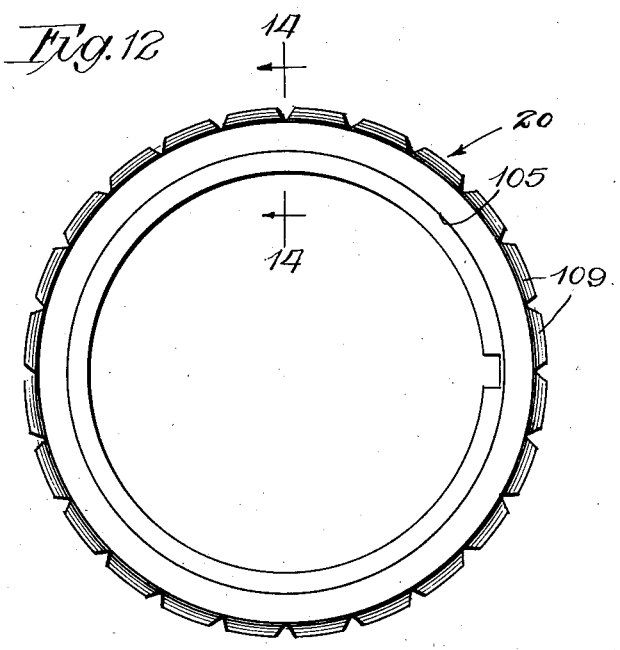
Figure 12 is a side view of one of the cleaner rolls.
Figure 13:
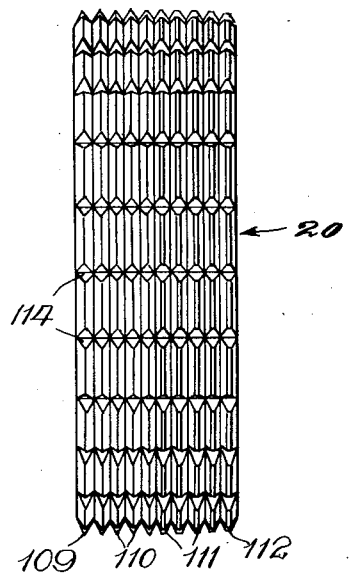
Figure 13 is a face view thereof.
Figure 14:
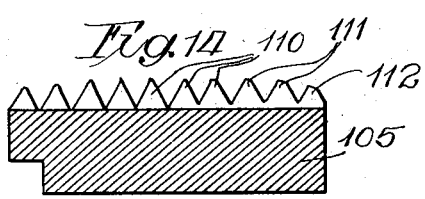
Figure 15:
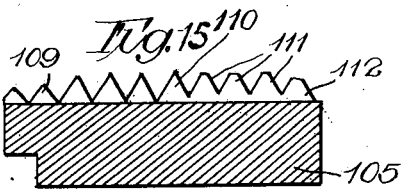
Figure 16:
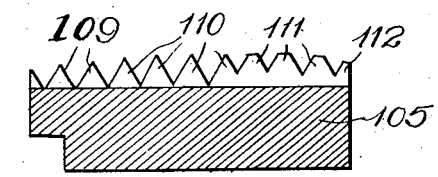

Figures 14, 15, and 16 are sectional details of the three rolls showing certain divergences between the roll faces, and indicated generally on the section line 14, 14 of Figure 12.

Figure 17 is a diagrammatic view illustrating in full and dotted lines flues of different diameters and the relative angles of the roll axes in adjustments for the two different diameters of flues indicated.

Figure 18 is a detail illustrating the adaptation of the rolls to a flue having different diameters.

In order that the action of the cleaner rolls on flues of different diameters may be understood, preliminary to a detailed description of the machine, reference is made to Figure 17 which indicates in full lines a tube T of small diameter and also indicates a tube T' of larger diameter. In said figure and in the remaining figures to be described the roll or rolls are indicated by the reference character 20, a single roll being shown in said Figure 17 in full lines presented to a flue of smaller diameter, and in dotted lines when presented to a flue of larger diameter. From an inspection of said Figure 17 as well as Figures 1, 2, and 5, it will be noted that the transverse acting or cutting faces of the rolls, or the parts of the roll faces in contact with the flues lie substantially in planes parallel to the axis of a flue being cleaned in all adjustments of the rolls for flues of different diameters. In other words, the rolls are not substantially tipped so as to bring the rolls in corner relation of the flues so as to lift the cutting faces thereof away from the flues. This arrangement is made possible by the connection of the cleaner roll shafts 23 with the power mechanism for driving them, and by reason of suitable means of guiding the said roll shafts in the grooves 21 of one of the frame plates 22 of the machine frame which will be more fully hereinafter described in connection with the radial adjustment of the rolls. It will be observed also by reference to Figure 17 that the axes of rotation of the rolls are at a considerable angle to the axis of the tube when operating on smaller flues, and that when the rolls are adjusted for larger flues the axes of said rolls and their shafts will more nearly approach parallelism to the axis of the larger flue, and that the rolls will always have substantially the same transverse face contact with the flues in both adjustments illustrated in Figure 17 and in other adjustments within the range of the machine. It will be noted, however, that the planes of the axes of the roll shafts will not be parallel to the axis of the largest flue for which the machine is designed, there being always a divergence of the planes of the rolls that will cause the flues to be fed past the rolls. In the further description of the machine, it will be observed that the rolls turn in horizontal planes about axes near corresponding sides of the roll faces, near the front sides of said faces as herein shown and illustrated in Figures 1 and 2. This behavior of the rolls under all adjustment is due to the connection of the roll shafts 23 with their driving shafts 24 through the medium of intermediate shaft sections 26 which are connected at their ends to the roll shafts 23 and drive shafts 24 through suitable universal driving joints 27, 28, as indicated most clearly in Figures 1, 2, 5, and 8, in connection with radially sliding members 29 that are radially guided between said frame member 22 and guide gibs 30, together with the eccentric relation of the turning axes of the rolls in horizontal planes when the rolls are radially adjusted. Said sliding members 29 are equipped with brackets 32 to carry bearings 33 for the roll shafts 23. All of the cleaner rolls rotate in the same direction and it will be observed from an inspection of Figure 17 that when the rolls are adjusted for smaller flues and, therefore, by their driving contact with smaller flues rotate the latter at comparatively high speed, the angles of the axes of rotation of said rolls are such with respect to the axis of the flue that the linear feed of the flue relatively to its speed of rotation will be substantially the same as when the rolls are adjusted radially outwardly to receive larger flues and wherein the rotative speed of the flue is correspondingly lessened. For instance, if the diameter of the rolls be six inches and are operating on six inch flues, a flue will be turned once for each rotation of the rolls,—whereas, if the flue be three inches in diameter, the flue will rotate at twice the speed of the rolls, but the linear feed of travel of each flue will be substantially the same for each rotation so that the cleaning action on each linear unit of flue will be substantially the same for each unit of rotation of the flue.

With these preliminary observations with respect to the action of the cleaner rolls on flues of different diameters whereby the transverse face contact of the rolls will be substantially the same on various diameter flues, and the linear feed of the flues relatively to their speeds of rotation remain substantially constant, thereby treating each linear unit length of flue with the same cleaning action of the rolls regardless of flue diameter,—the construction of the machine, with respect to the adjustment described, to the manner of driving the cleaner rolls, and to other features of the machine adapting it to various operations on different kinds of flues, and a detailed description of the machine in connection with such detailed illustration in all the drawings will now be considered.

The frame of the machine comprises a base 35 and two end members 22 and 36, the former of which has been referred to, and a tubular transverse member 37 co-axial with the space between the rolls to receive the flues. Within said hollow member 37 is located a tubular flue guide 38 fixed at one end of the frame, as by means of a hollow plate 39, and supported near its other end by a ring-like member 40. The tubular flue guide 38 extends at its latter end closely adjacent to the cleaner rolls 20 to prevent scales falling inwardly from the rolls and thereby avoid clogging the movable parts of the machine at the roll side of the machine by such scale cut from the flues. A machine designed to clean a rather wide range of diameters of flues, say from 1¼″ to 6″ will be provided with a number of these tubular guides 38 for interchangeable use with different diameter flues.

Referring now to the means for mounting the rolls, constructed to permit the rolls to be radially adjusted towards and from the axis of the guide 38, and calling attention more specially to Figures 1, 2, 5, 6, and 7 it will be noted that the roller supporting slides 29 before referred to, and shown in detail in Figure 9 are hollow castings that have guide flanges 42 which enter and slide in grooves formed between the parallel gibs 30 (Figure 3) and the outer face of the end member 22 of the frame, the gibs being screwed to parallel ribs 44 on said frame plate 22. The said slides 29, of which there are three, symmetrically disposed about the axis of the flue guide 38, are fixed to said frame member and a rocking adjusting ring 45, that lies just inside of the end member 22, by means of studs 46 the headed ends of which bear against bridge plates 47 that lie against the inner face of the ring 45, and are threaded at their outer ends to engage threaded sockets in the slides 29. The said studs extend through radial slots 48 in said end member 22 so as to permit the slides to which they are connected to move radially inwardly and outwardly, and the studs fit in curved blocks 48′ that slide in cam-shaped eccentric slots 49 angularly spaced about the ring for a purpose hereinafter to be described. The said adjusting ring has an annular groove co-axial with the axis of the flue guide 38 which is engaged by an annular rib 51 on the inner face of the frame member 22 and which serves as a bearing on which the ring 45 may turn or rock for a purpose hereinafter to be described.

Figure 7:
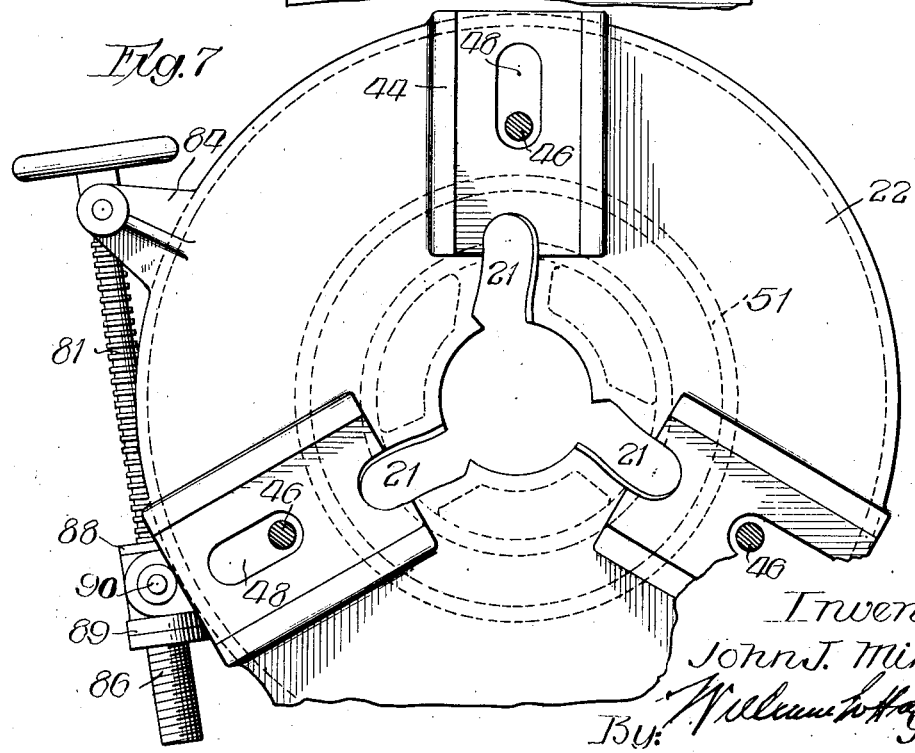
Figure 7 is a face view of that one of the frame members at the cleaner roll side of the machine.

The brackets 32 before referred to which carry the bearings 33 for the roll shafts 23 are not formed integral with the mounting slides 29 but are formed on plungers 55 and that extend into shells 56 of said slides and are capable of rotating therein. Said plungers are spring mounted in said shells by spiral compression springs 57 that surround the plungers 55 and are interposed between the outer ends of the shells and shoulders of the plungers, nuts 60 being threaded to the plungers to limit their inward movements. With this construction it will be noted that the cleaner rolls and their mounting slides may be moved inwardly and outwardly in radial planes to adapt the machine for different flue diameters, and the springs 57 serve to yieldingly press the cleaner rolls on the flues. It will be furthermore observed at this point that the axes about which the rolls turn horizontally are the axes of the plungers 55 which are disposed at the outer sides of the planes of the rolls (Figures 1 and 5) so that the turning of the rolls in their horizontal planes about the axes of the plungers 55 during radial adjustment of the rolls, as permitted by the guiding of the bearings 33 in the slots 21 of the frame plate 22 (which slots are not truly radial as shown in Figures 7 and 11, nor their edges in planes normal to the planes of the plate 22) serve to open the flue receiving opening at the entering side of the rolls to cause the flues to be fed past the rolls while also providing for different flue diameters and with a substantially uniform face contact of the rolls with different diameter flues.

The means herein shown for simultaneously adjusting the cleaner rolls and their mounting slides to adapt the machine to different diameters of flues are made as follows:

The eccentric or cam slots 49 of said adjusting ring 45 approach the center of the machine at their inner ends and recede from the center toward their outer ends, and the studs 46 connected to the adjusting slides extend through said cam slots as well also through the radial slots 48 hereinbefore described, the studs holding the ring 45 in close face engagement with the end frame member 22, while permitting rotation of the ring 45.

With this construction, and by reason of the fact that said roll adjusting plate 45 is mounted to turn on the rib 51 that is concentric to the axis of the tube guide 38, it will be observed that when said ring is turned in one direction, the said slides 29 and their cleaner rolls will be adjusted outwardly to adapt the machine to larger flues and that when the ring is turned the other direction the slides and their cleaner rolls will be adjusted inwardly toward each other to adapt the rolls to smaller flues; and that the cleaner roll bearings which are always at right angles to the plungers follow the mounting slides 29 through the generally radial slots 21 shown in Figure 10, thus permitting the rolls 20 to turn horizontally about the axes of the plungers 55 and to assume proper angles relatively to the flue for the purpose described, said plungers 55 being at all times truly radial to the axis of the flue guide 38.

Before completing the description of the operation of the manner of adjustment by which the cleaner rolls are adapted to flues of different diameters, attention will now be directed to the means for driving the roll shafts.

Figure 6:
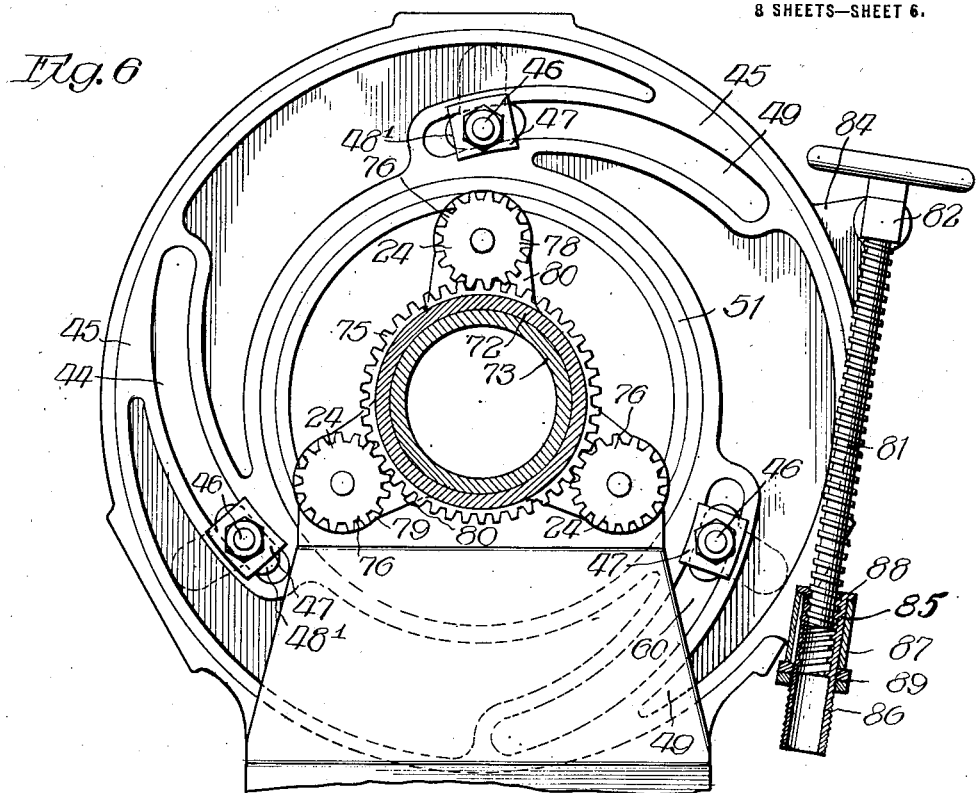
Figure 6 is a cross section on the line 6—6 of Figure 5.

In the present instance the machine is a motor-driven machine, but may, of course, be a belt-driven machine. As herein shown, 65 designates a motor that is supported on a mounting bracket or plate 66. A pinion 67 is fixed to the motor shaft on the side thereof adjacent to the cleaner rolls and meshes with a large gear 68 on a counter shaft 69 (Figures 2 and 5), which latter extends transversely across the machine beneath the motor and is mounted in suitable bearings on the machine frame. Fixed to the latter end of the counter shaft remote from the cleaner rolls is a pinion 70 which meshes with a large gear 71 whose hub 72 is mounted on an enlarged tubular bearing 70 73 formed on the transverse tubular member 37 of the frame. The hub 72 of the gear wheel 71 is formed with an annular series of gear teeth 75 which mesh with a plurality of pinions 76 that are symmetrically and equidistantly disposed about the axis of the hub. Said pinions 76 are fixed to the driving shafts 24 before referred to, which latter are mounted to rotate in bearings 79 that are formed on the outer ends of radial arms 80 which are shown as made integral with the transverse member 37 of the frame, as best shown in Figures 1, 5, and 6. With this construction it will be noted that all of the rolls 20 are rotated in the same direction, and, furthermore, that the intermediate shaft sections 26 permit the rolls and their mountings to be radially adjusted with respect to the axis of the shaft 24, while efficiently transmitting driving power to said rolls.

Referring now to the means for rotating the ring 45 thereby adjusting the rolls and their mountings radially inwardly and outwardly, said means are herein shown as follows:

81 designates a screw shaft mounted obliquely adjacent to and inside the adjusting ring 45. The upper end of said screw shaft rotates in a sleeve 82, which is pivoted at 83 to a lug 84 that is integral with the frame member 22, whereby the screw shaft is free to rotate in said sleeve 82 and to swing about the axis of the pivot 83. The lower end of the screw shaft 81 is threaded into a sleeve nut 85 which is interiorly threaded to receive the shaft and has an extended sleeve 86 that is externally threaded at its lower end and is of interior diameter at its lower end or extension to permit the screw shaft 81 to slide therein. Surrounding said sleeve nut is a casing 87 in which the sleeve nut is splined so that said casing may move longitudinally on the sleeve nut and is adapted to be locked to the nut between a flange 88 on the upper end of the nut and spanner nuts 89 that are threaded to the extended sleeve end 86, as shown in Figures 4 and 6. Said casing 87 is pivotally supported at 90 to a lug on the adjusting ring 45. With this construction it will be noted that when the casing 87 is confined between the nuts 89 and the flange 88 and the screw shaft 81 is turned in one direction, it acts, by reason of its pivotal abutment connection to the fixed frame plate 22 and of its screw threaded connection to the sleeve nut 85 to rotate the ring 45 about its axis in a direction, depending upon the direction of rotation of the screw shaft 81, and the rotation of said ring acts, through the studs 46 and the cam slots before referred to to move said studs and the roller mounting slides 29 radially inwardly or outwardly, depending on the direction of rotation of the shaft 81; the threaded connection of the shaft 81 to the sleeve nut 85 serving to lock the adjusting ring in any particular adjustment given thereto, which adjustment will be maintained for a given diameter of flue having no offsets therein.

This adjusting mechanism provides means for adjusting the machine to tubes which vary in diameter but are of the same diameter throughout their lengths. In some instances the machine is called upon to clean tubes which are of different diameters in their lengths, such, for instance, as the tube T' shown in Figure 18. The tube therein shown is a typical form of superheater tube, it comprising two diameters $t$, $t'$ with a shoulder $t^2$ between them. In order that the scale may be properly removed from the shoulder portion $t^2$ of the tube, and also in order that means may be provided for automatically adjusting the machine to operate on both diameters of the tube, means as follows are provided which co-operate with said adjusting screw; when operating on the flue T', shown in Figure 18, the nuts 89 are backed away from the lower end of the casing 86 so that said casing may have movement relatively to the sleeve nut 85 and the screw shaft 81, thus providing a lost motion between the said shaft and adjusting ring. In connection with this lost motion, gravity actuated mechanism is provided for operating on the adjusting ring and therethrough to hold the cleaner rolls 20 pressed against both the diameters of the flue T', it being understood that the larger end of the flue T' is first presented to the cleaner rolls and that gravity actuated mechanism operates through the ring 45 and the mounting slides 29 to press the cleaner rolls on both the large and the smaller diameters of the flue and to gradually apply said rolls to the descending shoulder when the said shouldered portion of the flue is passing said rolls.

A convenient form of gravity actuated mechanism herein shown embraces the following elements.

95 designates a lever which is fixed to a rock shaft 96 which extends across the base of the frame and said lever carries a weight 97 which may be adjustable along said lever. 98 designates a link which is loosely connected at its lower end to a lever 95 of the rock shaft 96. Said link is loosely connected at its upper end at 99 to a lug 100 which springs outwardly from the adjusting ring 45. The lever 95 is provided with an extension having a foot piece 102 thereon, whereby the forward end of the lever may be depressed and the weight end thereof elevated for the purpose of moving the cleaner rolls away from each other when inserting a flue therebetween.

When the machine is to be adjusted to operate on flues having different diameters in their lengths, the nuts 89 are backed away from the casing 87 and the cleaner rolls are separated a distance to receive the larger diameter of the flue by foot power exerted on the lever 95. Upon the introduction of the flue between the rolls and release of the foot power the weight 97 serves to press the cleaner rolls against the larger diameter of the flue, and by reason of the fact also that there is a loose or slip connection between the shaft 81 and the said adjusting ring 45, the rolls are held pressed against the larger diameter of the flue and when said flue is moved to bring its shouldered portion in contact with the rolls, the weight 97 serves to turn the ring 45 in a direction to cause the cleaner rolls to follow said shouldered portion of the flue and to thereafter close them on the smallest diameter $t'$ of the flue. The range of the lost motion between the flange 88 of the sleeve nut and the nuts 89 will be adjusted by first raising the said sleeve nut when it is fixed relatively to the ring 45 and turn said ring to correspond with the largest diameter of the flue, and thereafter release the nuts 89 from the sleeve nut 85 to adjust the rolls to the smallest diameter of the flue. After the machine has been thus adjusted the rolls are spread apart to receive the largest diameter of the flue by applying power pressure through the foot member 102 and the flue is inserted between the rolls. The weight serves to maintain the required pressure of the rolls on the tube (which in a straight tube is effected by the springs 57 throughout the length of the flue), causing the rolls to follow the shoulder $t^2$ to the smallest diameter, the nuts 89 finally limiting the farthest inward movement of the rolls when the flue moves away from the machine.

A particular form of the cleaner rolls is shown in Figures 12 to 16, inclusive. Each of said rolls comprises an annular ring-like portion 105 that is non-rotatively mounted on a head 106 that is fixed to the roll shafts 23 in any suitable manner. The cutting or cleaning faces of the rolls formed on the exterior of said rings is best shown in Figures 13, 14, 15, 16. In Figures 13, 14, 15, and 16, it will be noted that the configuration of the cleaning surface embraces a plurality of sidewise disposed teeth, relatively to the transverse dimension of the face, which teeth are, respectively, designated at 109, 110, 111, and 112. The teeth 109 are short, sharp-faced teeth and are located at the inner sides of the cleaner rolls, or what may be termed in the assembled rolls, comparing the assembly with a nut, the entering threads to facilitate the entry of a flue therebetween. The teeth 110, 111 are longer teeth and are substantially of the same length, but the teeth 111 are slightly truncated. The teeth 112 are made shorter than the teeth 110, 111 for the purpose of adapting them to the shouldered portion $t^2$ of the flue T' shown in Figure 18. If the roller face be designed for cleaning flues of one diameter throughout, the said teeth 112 would be made as long as the teeth 110, 111. The teeth 109 as well at the teeth 110, which are sharp teeth, have the effect to gradually penetrate the scale coating of the flue while the truncated teeth have the effect to remove by impact scale that has been punctured by the sharper teeth. The teeth of the three cleaner rolls are slightly offset relatively to each other in order that their active surfaces may overlap so that the action on the scale of the flue will be uniform throughout the length of the flue. It will be furthermore noted by reference to Figure 13 that the said teeth are made in relatively short lengths, considered in respect of the circumference of the toothed faces of the rolls, there being spaces 114 between adjacent parallel rows of teeth. The purpose of thus interrupting the circular continuity of the teeth is to provide numerous sharp-edged points to thereby both attack and break up the scale on the flues.

It will be observed that I have provided a very simple and effective machine for cleaning flues of largely varying diameters, with a very simple adjustment of the machine part. It will also be seen that the machine is effective to fully remove the flue scale. It will be understood that the machine is a full operative machine for cleaning straight flues without the automatic gravity actuated mechanism but that the latter mechanism may be very readily fitted as an attachment to the main machine.

It will be furthermore understood that variations of the disclosed structural details may be made, and that said details are capable of some variation within the scope of the appended claims, and, further, that it is the intent to claim all of inherent novelty disclosed in the application.

I claim as my invention,—

1. A flue cleaning machine comprising a series of rolls rotative in the same direction about a flue-receiving space, and jointed, driving and guiding means permitting radial adjustment of said rolls to adapt the machine to flues of different diameters while maintaining substantially uniform transverse face contact of the rolls with all said flues.

2. A flue cleaning machine comprising a series of rolls rotative in the same direction about axes enclosing a flue receiving space, and means to radially adjust the rolls towards and from said space and to simultaneously turn said rolls about axes at right angles to the axis of said flue space.

3. A flue cleaning machine comprising a series of cleaner rolls rotative in the same direction about a flue-receiving space, and means whereby said rolls may be adjusted about axes in planes at right angles to the axis of said flue-receiving space.

4. A flue cleaning machine comprising a series of cleaner rolls rotative in the same direction about a flue-receiving space, and means whereby said rolls may be adjusted about axes in planes at right angles to the axis of said flue-receiving space and radially toward and from said latter axis.

5. A flue cleaning machine comprising a series of cleaner rolls rotating in the same direction about a flue-receiving space, means for driving said flues and adjusting means to adjust the rolls radially towards and from the flue receiving space, combined with means to permit the rolls to be adjusted to present substantially uniform cleaning faces to flues of different diameters.

6. A flue cleaning machine comprising a series of rolls rotative in the same direction about a flue-receiving space, means to adjust said rolls towards and from the axis of said space, and means to pivot said rolls to permit each roll to turn about radially disposed axes that are located at one side of the planes of the rolls.

7. A flue cleaning machine comprising a series of rolls symmetrically disposed with respect to, and rotative in the same direction about, a flue-receiving space, and guide mountings for said rolls radially adjustable on a support at right angles to the axis of said flue-receiving space on which the said rolls are rockingly mounted to turn on axes parallel to the radial path of adjustment of said rolls.

8. A flue cleaning machine comprising a series of rolls symmetrically disposed with respect to, and rotative in the same direction about, a flue-receiving space, a plate provided with radial guides, roll mountings movably supported in said guides, said rolls being rockingly supported by said mountings to permit them to turn in planes parallel to said radial guides, and means to radially adjust said mountings in said plate guides.

9. A flue cleaning machine comprising a series of rolls symmetrically disposed with respect to, and rotative in the same direction about, a flue-receiving space, roller mountings, a plate having an opening co-axial with said space and provided with radial guides in which said mountings are slidable, plungers carried by said guides and formed with brackets in which the roll shafts are rotatively mounted, said plate provided at said guides with radial slots, bolts extending through said slots to fasten the guides to the plate, said plate being provided at its central opening with through, generally, radial slots having curved walls through which the roll shafts extend, means for driving the roll shafts, and means for radially adjusting the roll mountings in said plate guides.

10. A flue cleaning machine comprising a series of rolls symmetrically disposed with respect to, and rotative in the same direction about, a flue receiving space, roll mountings, a plate having an opening co-axial with said space and provided with radial guides in which said mountings are slidable, plungers carried by said guides and formed with brackets in which the roll shafts are rotatively mounted, said plate provided at said guides with radial slots, studs extending through said slots to fasten the mountings to the plate, said plate being also provided at its central opening with through, generally, radial slots having curved walls through which the roll shafts extend, means for driving the roll shafts, a rocking adjusting ring in rear of and mounted on said plate and provided with angularly spaced cam slots, the ends of the mounting studs extending through the said radial plate openings and into said cam slots, whereby rotation of said ring adjusts the roll mountings radially on said frame, and the curved radial slots acting on said roll shafts to turn the rolls relatively to the axes of said plungers.

11. A flue cleaning machine comprising a frame plate formed on one side with radial guides and inside said guides with radial slots and formed near the center of the plate with substantially through radial slots having curved walls, a rocking member mounted on the frame plate and formed with angularly spaced cam slots, a series of rolls provided with shafts extending through said curved radial slots, roll mountings movable in said guides, studs connected to said mountings and extending through the radial slots at said guides and through the cam slots of said rocking ring, and means for driving the roll shafts.

12. A flue cleaning machine comprising a frame plate having an axial opening and formed on one side with radial guides and inside said guides with radial slots and formed at the center opening of the plate with substantially through radial slots having curved walls, a series of rolls provided with shafts extending through the latter slots, roll mountings movable in said guides, plungers rotative in said mountings and provided with bearings for said roll shafts, and means to adjust said roll mountings and the rolls.

13. A flue cleaning machine comprising a frame plate having an axial opening and formed on one side with radial guides and inside said guides with radial slots and formed at the center opening of the plate with substantially radial through slots having curved walls, a series of rolls provided with shafts extending through the latter slots, roll mountings movable in said guides, plungers rotative in said mountings and provided with bearings for the cleaner roll shafts, a ring rockingly mounted on said frame and provided with a series of angularly spaced cam slots, studs fixed to said mountings and extending through the radial slots of the plate at the guides and into said cam slots, and means whereby said rocking ring may be rotated on the frame.

14. A flue cleaning machine comprising a frame plate having an axial opening and formed on one side with radial guides and inside said guides with radial slots and formed near its axial opening with substantially radial slots having curved walls, a series of rolls provided with shafts extending through the latter slots, roll mountings movable in said guides, studs connected to said mountings and extending through the radial slots at said guides and through the cam slots of said rocking ring, means for driving the roll shafts, and springs acting on the plungers to press the rolls towards each other.

15. A flue cleaning machine comprising a frame plate having an axial opening and formed on one side with radial guides and inside said guides with radial slots and formed near its axial opening with substantially radial slots having curved walls, a series of rolls provided with shafts extending through the latter slots, roll mountings movable in said guides, plungers rotative in said mountings and provided with bearings for the cleaner roll shafts, means to radially adjust said roll mountings and the rolls relative to the plane of said plate, and means for rotating said roll shafts comprising a driven gear, a series of angularly spaced pinions meshing therewith, and having shafts which are connected to the roll shafts by intermediate flexibly connected shafts.

16. A machine for cleaning flues comprising a frame having a central opening and a series of curved slots generally radial to the axis of said opening, a series of cleaner rolls rotative in the same direction about a flue-receiving space co-axial with said frame opening and having driving shafts which extend through said slots, slides mounted to move radially on said frame toward and from the axis of said opening and carrying bearings for said roll shafts, and means to radially adjust said slides and thereby said rolls.

17. A machine for cleaning flues comprising a frame having a central opening and a series of curved slots generally radial to the axis of said opening, a series of cleaner rolls rotative in the same direction about a flue receiving space co-axial with said frame opening and having driving shafts which extend through said slots, slides mounted to move radially on said frame toward and from the axis of said opening and provided with rotative plungers which support bearings for said roll shafts, means to drive the roll shafts, and means to adjust said slides radially on said frame.

18. A machine for cleaning flues comprising a frame having a central opening and a series of curved slots generally radial to the axis of said opening, a series of cleaner rolls rotative in the same direction about a flue-receiving space co-axial with said frame opening and having driving shafts which extend through said slots, slides mounted to move radially on said frame toward and from the axis of said opening and provided with rotative plungers offset from the planes of the rolls and carrying bearings for the roll shafts, means to drive said roll shafts, and means to radially adjust said slides.

19. A machine for cleaning flues comprising a frame having a central opening and a series of curved slots generally radial to the axis of said opening, a series of cleaner rolls rotative in the same direction about a flue-receiving space co-axial with said frame opening and having driving shafts which extend through said slots, slides mounted to move radially on said frame toward and from the axis of said opening and provided with rotative plungers which support bearings for said roll shafts, and springs in said slides to force the rolls toward each other.

20. A machine for cleaning flues comprising a series of cleaner rolls rotative in the same direction about a flue-receiving space, shafts to which the rolls are fixed, a frame having curved, generally radial slots through which the roll shafts extend, slides radially movable on the frame toward and from the axis of said roll-receiving space to support the roll shafts, and driving means for the roll shafts embracing a driving gear, a series of angularly spaced pinions meshing therewith whose shafts are rotatively mounted in bearings in said machine, and intermediate driving shaft sections having flexible connection with the roll shafts and with said driving pinion shafts.

21. A machine for cleaning flues comprising a frame having a central opening and a series of curved slots generally radial to the axis of said opening, a series of cleaner rolls rotative in the same direction about a flue-receiving space co-axial with said frame opening and having driving shafts which extend through said slots, slides mounted to move radially on said frame toward and from the axis of said opening and carrying bearings for said roll shafts, means to radially adjust said slides and thereby the rolls, and driving means for the roll shafts embracing a driving gear, a series of angularly spaced pinions meshing therewith having shafts mounted in bearings in said machine, and intermediate driving shaft sections flexibly connected with said pinion drive shafts and said roll shafts.

22. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, and means to radially adjust said rolls comprising a rocking ring provided with a series of angularly spaced cam slots, and connections between said cam slots and supports for the rolls.

23. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, and means to radially adjust said rolls comprising a rocking ring provided with a series of angularly spaced cam slots, and mountings radially slidable on said frame and carrying bearings in which the roll shafts are mounted and provided with parts which extend through radial slots in the frame and into said cam slots.

24. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, and means to radially adjust said rolls comprising a rocking ring provided with a series of angularly spaced cam slots, and mountings radially slidable on said frame and carrying bearings in which the roll shafts are mounted and provided with parts which extend through radial slots in the frame and into said cam slots.

25. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, means to radially adjust said rolls comprising a rocking ring provided with a series of angularly spaced cam slots, mountings radially slidable on said frame and carrying bearings in which the roll shafts are mounted and provided with parts which extend through radial slots in the frame and in said cam slots, and means whereby the rolls are turnable in their planes as they are adjusted radially.

26. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, means to radially adjust said rolls comprising a rocking ring provided with a series of angularly spaced cam slots, mountings radially slidable on said frame and carrying bearings in which the roll shafts are mounted and provided with parts which extend through radial slots in the frame and into said cam slots, and means to rock said ring comprising a screw shaft rotatively and pivotally connected to said frame, a nut pivotally connected to said ring and engaging said screw shaft, and means whereby said nut may be adjusted relatively to the screw shaft to adapt the rolls to flues of different diameters.

27. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, and means to radially adjust said rolls comprising a rocking ring provided with a series of angularly spaced cam slots, mountings radially slidable on said frame and carrying bearings in which the roll shafts are mounted and provided with parts which extend through radial slots in the frame and into said cam slots, a screw shaft pivotally and rotatively connected to said head, a nut engaging the screw shaft, and a connection between said nut and said ring whereby said nut may be adjusted along the length of the screw shaft and locked thereon.

28. A machine for cleaning flues comprising a frame having an opening and a series of curved slots generally radial to and communicating with said opening, a series of cleaner rolls rotative in the same direction about a flue-receiving space co-axial with said opening and having driving shafts that extend through said slots, and means to radially adjust said rolls comprising a rocking ring provided with a series of angularly spaced cam slots, mountings radially slidable on said frame and carrying bearings in which the roll shafts are mounted and provided with parts which extend through radial slots in the frame and into said cam slots, a screw shaft rotatively and pivotally connected to the frame, a casing pivoted to said ring, a sleeve nut splined in the casing into which the screw shaft enters, and nuts threaded to the extended end of the sleeve nut for confining the casing therebetween and a flange on said sleeve nut.

29. A machine for cleaning flues of different diameters along their length comprising a series of rolls rotative in the same direction about a flue-receiving space, means to drive said rolls, and means common to and acting on the rolls to cause the rolls to be pressed against a flue and to automatically adapt them to different diameters of the flue.

30. A machine for cleaning flues of different diameters along their length comprising a series of rolls rotative in the same direction about a flue-receiving space, means to drive the said rolls, and weight-actuated mechanism common to said rolls to press the rolls against the flue constructed to cause the rolls to follow varying diameters of the flue.

31. A machine for cleaning flues of different diameters along their length comprising a series of rolls and their mountings and rotative in the same direction about a flue-receiving space, means to drive said rolls, and means to cause the rolls to be pressed on the flue comprising a pivoted weighted lever, and a connection between said lever and the mountings for the rolls.

32. A machine for cleaning flues comprising a frame, a series of cleaner rolls rotative in the same direction about a flue-receiving space, a rocking adjusting member for radially adjusting said rolls, a screw shaft pivotally and rotatively supported on the frame, a nut pivotally supported on said adjusting member, and means affording lost motion between said screw shaft and said adjusting ring.

33. A machine for cleaning flues comprising a frame, a series of cleaner rolls rotative in the same direction about a flue-receiving space, a rocking adjusting member for radially adjusting said rolls, a screw shaft pivotally and rotatively supported on the frame, a nut pivotally supported on said adjusting member, and means affording lost motion between said screw shaft and said adjusting ring constructed to cause the rolls to automatically follow a flue of different diameters in its length.

34. A machine for cleaning flues comprising a frame, a series of cleaner rolls rotative in the same direction about a flue-receiving space, a rocking member for radially adjusting said rolls, a screw shaft pivotally and rotatively supported on said frame, a casing pivoted to said adjusting member, a sleeve nut threaded to the screw shaft and splined in said casing, and nuts threaded to an extension of the sleeve nut for confining said casing therebetween and a shoulder on the sleeve nut.

35. A machine for cleaning flues comprising a frame, a series of cleaner rolls rotative in the same direction about a flue-receiving space, a rocking member for radially adjusting said rolls, a screw shaft pivotally and rotatively supported on said frame, a casing pivoted to said adjusting member, a sleeve nut threaded to the screw shaft, a nut threaded to an extension of the sleeve nut for confining said casing therebetween and a shoulder on the sleeve nut, and a weight applied to said adjusting member to adjust the rolls from a larger to a smaller diameter of the flue.

36. A machine for cleaning flues comprising a frame, a series of cleaner rolls rotative in the same direction about a flue-receiving space, a rocking member for radially adjusting said rolls, a screw shaft pivotally and rotatively supported on the frame, a casing pivoted to said adjusting member, a sleeve nut threaded to the screw shaft and splined in said casing, nuts threaded to an extension of the sleeve nut for confining said casing therebetween and a shoulder on the sleeve nut, a weighted lever pivoted to the frame, and a link operatively connecting said lever to said adjusting member.

37. A machine for cleaning flues comprising a frame, a series of cleaner rolls rotative in the same direction about a flue-receiving space, a rocking member for radially adjusting said rolls, a screw shaft pivotally and rotatively supported on the frame, a casing pivoted to said adjusting member, a sleeve nut threaded to the screw shaft and splined in said sleeve, nuts threaded to an extension of the sleeve nut for confining said casing therebetween and a shoulder on the sleeve nut, a weighted lever pivoted to the frame, and a link loosely connected at one end to said rock shaft and at its other end to said rocking adjusting member.

38. A machine for cleaning flues comprising a series of cleaner rolls rotating in the same direction about a flue-receiving space, with means to drive them, and means whereby said rolls may be adjusted towards and away from each other and may be turned on axes parallel to their planes, said rolls having cleaning teeth, with the teeth of one roll out of line with those of the other rolls.

39. A machine for cleaning flues comprising a series of cleaner rolls rotating in the same direction about a flue-receiving space, with means to drive them, and means whereby said rolls may be adjusted towards and away from each other, the cleaning faces of said rolls comprising a plurality of elongated teeth, with the teeth at the flue-receiving side of said receiving space shorter than the other teeth.

40. A machine for cleaning flues comprising a series of cleaner rolls rotating in the same direction about a flue-receiving space, with means to drive them, and means whereby said rolls may be adjusted towards and away from each other, the cleaning faces of said rolls comprising a plurality of elongated teeth, with the teeth at the receiving side of said flue-receiving space shorter than the other teeth, the intermediate teeth of the rolls being of substantially the same length, with some of said teeth truncated.

41. A machine for cleaning flues comprising a series of cleaner rolls rotating in the same direction about a flue-receiving space, with means to drive them, and means whereby said rolls may be adjusted towards and away from each other, the cleaning faces of said rolls comprising a plurality of elongated teeth, with the teeth at the flue-receiving side of said receiving space shorter than the other teeth, and the teeth at the outer side of the flue-receiving space being shorter than the intermediate teeth.

42. A machine for cleaning flues comprising a series of cleaner rolls rotating in the same direction about a flue-receiving space, with means to drive them, and means whereby said rolls may be adjusted towards and away from each other, the cleaning faces of said rolls comprising a plurality of elongated teeth with the teeth at the receiving side of said flue-receiving space shorter than the other teeth, the intermediate teeth of the rolls being of substantially the same length, with some of said teeth truncated, the said teeth being arranged in transverse sets longitudinally spaced to form at the ends of the teeth sharp cutting edges.

43. A cleaner roll for flue-cleaning machines provided with a cleaning surface formed with a plurality of transversely parallel, circumferentially extending teeth, the teeth at one side of the cutting face being shorter than the intermediate teeth, and some of the intermediate teeth being truncated.

44. A cleaner roll for flue-cleaning machines provided with a cleaning surface formed with a plurality of circumferentially parallel, transversely spaced teeth, the teeth at one side of the cutting face being shorter than the intermediate teeth, and some of the intermediate teeth being truncated, said teeth being divided by transverse grooves to form sharp-cutting edges between the ends of the teeth.

45. A cleaner roll for flue-cleaning machines provided with a cleaning surface formed with a plurality of circumferentially parallel, transversely spaced teeth, the teeth at one side of the cutting face being shorter than the intermediate teeth, said teeth being divided by grooves extending transversely of the roll face to form at the ends of the teeth sharp cutting edges.

In witness whereof that I claim the foregoing as my invention I hereunto set my hand and affix my seal this 11th day of November 1919.

JOHN J. MIKSHEL. [L. S.]